Feb. 16, 1971     M. A. SEGURA ET AL     3,563,825
METHOD FOR INSULATING PIPELINES WHEREIN MORE INSULATING
MATERIAL IS ABOVE THE CENTER LINE OF THE PIPE
THAN BELOW THE CENTER LINE
Filed Jan. 26, 1965     3 Sheets-Sheet 1
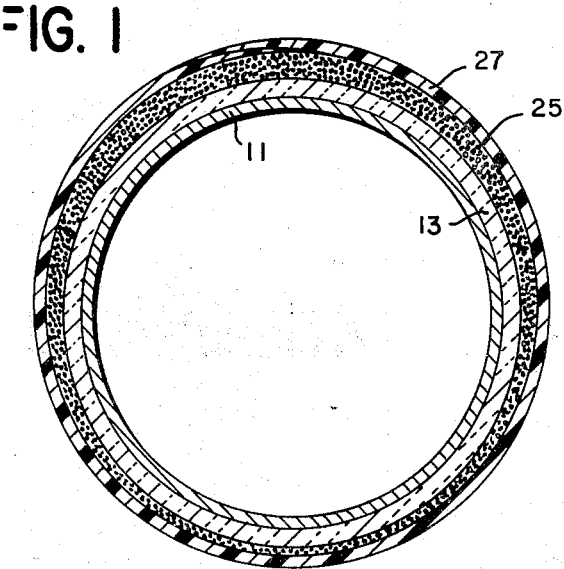
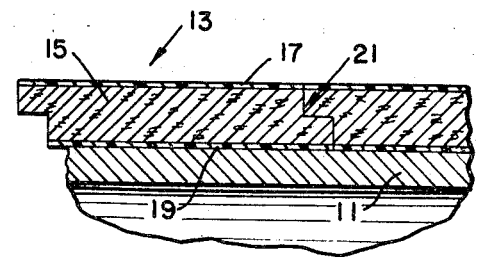
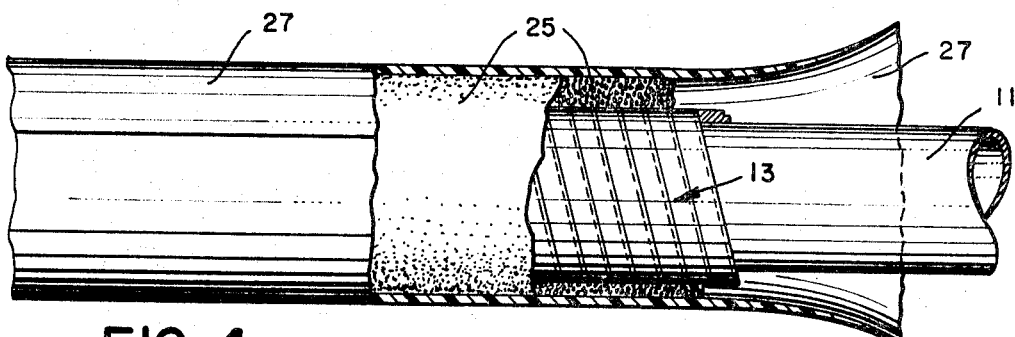
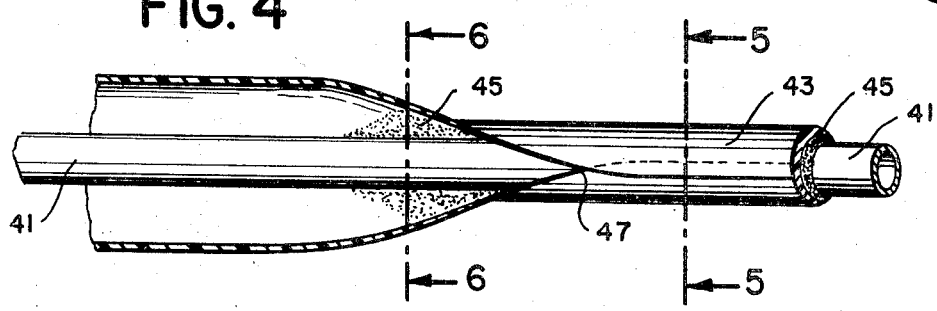
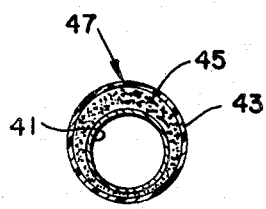
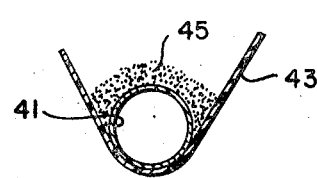
INVENTORS
MARNELL A. SEGURA
HOWARD T. OAKLEY
BY
WHELAN, CHASAN, LITTON, MARX & WRIGHT
ATTORNEYS FIG. 10
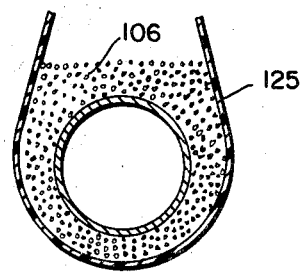
FIG. 11
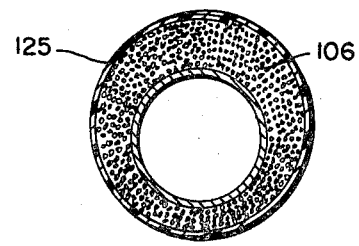
FIG. 12
FIG. 13
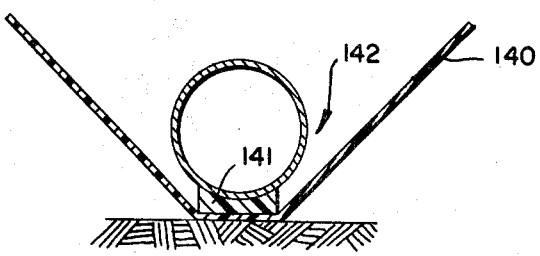
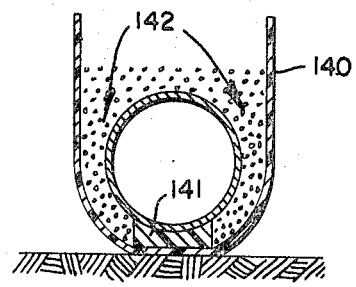
FIG. 14
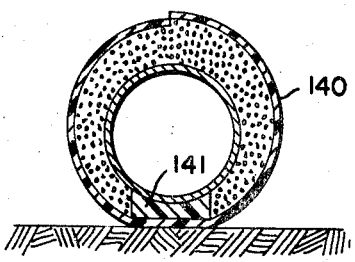
FIG. 15
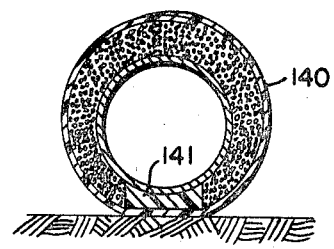
INVENTORS
MARNELL A. SEGURA
HOWARD T. OAKLEY
BY
WHELAN, CHASAN, LITTON, MARX & WRIGHT
ATTORNEYS

United States Patent Office 3,563,825
Patented Feb. 16, 1971

3,563,825
METHOD FOR INSULATING PIPELINES WHEREIN MORE INSULATING MATERIAL IS ABOVE THE CENTER LINE OF THE PIPE THAN BELOW THE CENTER LINE
Marnell Albin Segura, East Baton Rouge, La., and Howard T. Oakley, Elizabeth, N.J., assignors to Esso Research and Engineering Company, a corporation of Delaware
Filed Jan. 26, 1965, Ser. No. 428,182
Int. Cl. F16l 59/02
U.S. Cl. 156—187                         9 Claims

ABSTRACT OF THE DISCLOSURE

A method of applying a pourable or foamable insulation to a pipe wherein the insulation is flowed into an outer wrapper sheet underlying the pipe, and the wrapper sheet is thereafter joined along its longitudinal edges to tightly enclose the insulation about the pipe. The method may include the preliminary step of also helically wrapping the pipe with an insulation tape. Preferably, the insulation is flowed into the wrapper in such a way as to place a greater proportion of the insulation on one side of the pipe than on the other to thereby obtain maximum insulation value per unit mass of insulation.

---

The present invention relates to an improved method and apparatus for insulating pipelines. It has particular application to the insulation of hot pipelines in such a manner as not only to afford thermal insulation but also to provide protection against corrosion.

The use of heated pipelines is becoming increasingly important, not only in industrial processes and manufacturing but also in heating of residential and commercial establishments. Steam, hot water, hydrocarbon oils at elevated temperature, hot gases, vapors, and various liquids are commonly transported in such lines. Since most pipelines pass underground, being buried to a depth of a foot or two, or much more in some cases, there are substantial thermal losses between hot pipelines and the ground unless satisfactory insulation is provided. The type of insulation that is commonly used in building construction and in dry places is not at all satisfactory for the protection of hot pipelines underground. In addition, the conductivity of the earth, particularly when it is wet, is substantially higher than the conductivity of air or air filled spaces above ground. Hence, thermal protection becomes much more important underground than above ground when heat is to be conserved.

At the same time, the ground conditions in most cases are highly conducive to rapid corrosion of heated pipelines. The presence of moisture and of various salts, acids, etc., in the ground, in connection with the elevated temperature of metal pipe contributes to rapid corrosion. Such corrosion, unless checked effectively, results in early destruction of heated pipelines, or lines carrying fluids at high temperature or unless proper protection is given.

It is an object of the present invention to provide an effective thermal insulation for hot pipelines which is relatively cheap and economical. A related object is to devise pipe covering materials and methods which will give full protection of underground heated pipelines against corrosion such as is due to the presence of moisture, chemicals, and all kinds of corrosive materials and influences in the soil. By providing a good degree of electrical insulation, protection against stray electric currents and the corrosion they cause, is also obtained.

The present invention involves several aspects or embodiments of pipeline protection. It relates to an improved type of insulating material and to combinations of materials which are effective to accomplish the general objects stated above. It relates also to a manner or method of applying insulation economically, particularly to applying it in such a way as to obtain the maximum insulating value per unit of mass, or volume, of insulating material.

A further aspect of the invention relates to the combination of ingredients or components or insulating materials used. These are selected and combined so as to give desirable structural or load-supporting qualities to the installation and at the same time not render it unduly conductive thermally.

A still further aspect of the invention relates to a method for the production of a porous or foam type insulation material which is formed in situ about the pipe. The foamed material is then combined with suitable outer wrapping material, thus protecting the insulating material so as to preserve it against the destructive elements in the ground.

Still another aspect of the invention relates to an improved and economical method for insulating a pipe with a minimum of labor. The method includes the use of a water resistant outer covering material, the application by simple mechanical means of the insulating material between the pipe and the covering or wrapping material, and the final sealing of the wrapping material. The latter is done so as to enclose the insulating composition within the wrapper. This protects both the insulating composition and the pipe against corrosion.

Further aspects of the invention involve particular means or apparatus by which the method steps may be carried out efficiently. These include and comprehend, for example, a vehicular system that is adapted to apply the insulation along the line progressively and continuously. Means are included to bring the covering material into proper form about the pipe in continuous movement and to apply the insulation as the wrapper is formed. Means are included also to effectively seal the covering material so as to make it moisture proof and otherwise tight against the elements in the soil which might cause damage to the insulation and the pipeline.

In some of its aspects, the invention is applicable to insulated pipelines above ground as well as those underground.

The invention will be more fully understood by reference to the accompanying drawings, which form a part of this specification.

In said drawings, FIG. 1 is an enlarged cross sectional view of a wrapped pipeline illustrating the elements or components or insulating material which are included, according to a preferred embodiment, for thermal and corrosion protection of the pipeline.

FIG. 2 is an enlarged cross sectional view of a wrapping element specially designed for application to a pipeline.

FIG. 3 is a fragmentary sectional view of a pipeline which is wrapped with a combination of insulating materials, arranged according to a preferred embodiment of the invention.

FIG. 4 shows another arrangement, illustrating the successive and progressively continuous application of the insulating material and the wrapper along a pipeline.

FIGS. 5 and 6 are detailed across sectional views taken respectively along the lines 5—5 and 6—6 of FIG. 4.

Figure 7:
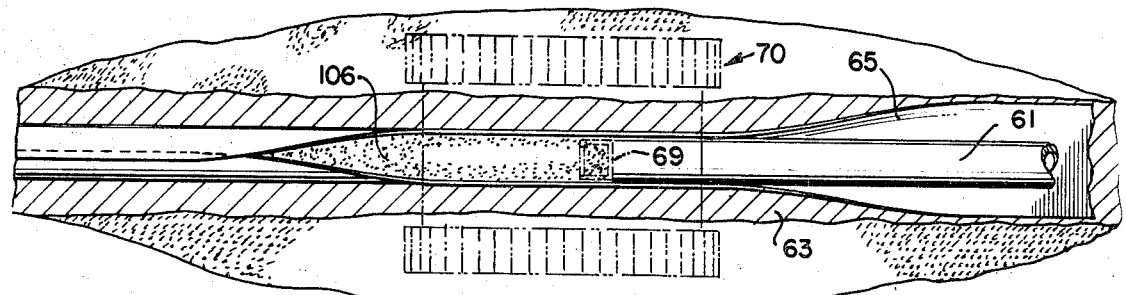

FIG. 7 is a plan view illustrating a system for applying an insulating combination layer to the pipeline.

Figure 8:
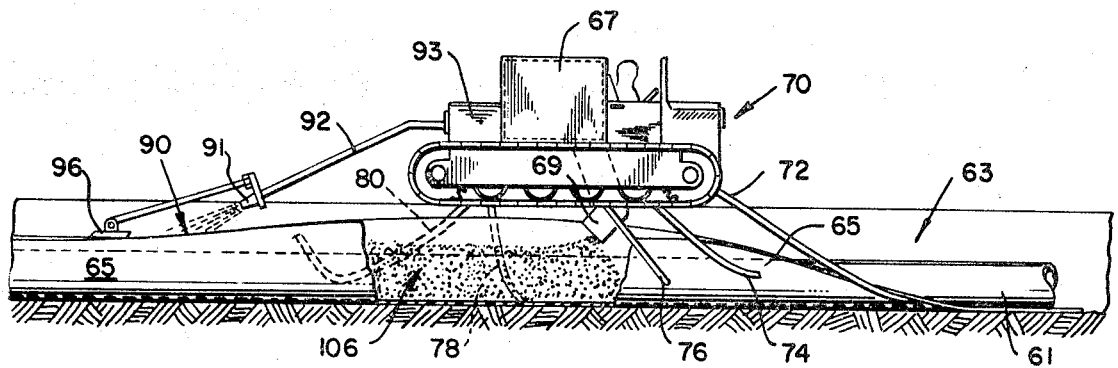

FIG. 8 is a side view of the system of FIG. 7 and shows mechanical means for carrying it out.

Figure 9:
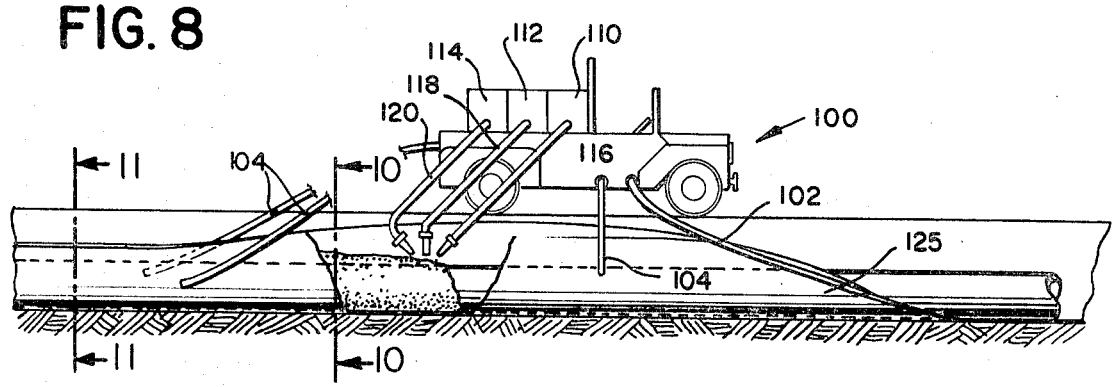

FIG. 9 is a view of a modified system and apparatus for carrying it out.

FIGS. 10 and 11, respectively, are cross sectional views of the pipeline and insulating and wrapping material of FIG. 9 taken respectively along the lines 10—10 and 11—11 of FIG. 9.

FIGS. 12, 13, 14 and 15, respectively, are detailed cross sectional vnews illustrating the formation of an insulating system about a pipeline in the ground.

Referring first to FIG. 1, there is shown in section a pipeline 11 which has applied to its outer surface an insulating tape of material which not only provides thermal insulation but also provides good protection against corrosion. This is indicated at 13 and is a complex layer which, as shown in FIG. 2, embodies not only insulation material 15 but inner and outer protective cover sheets 17 and 19, respectively. This composite tape is applied next to the pipe as shown in FIG. 2. It is adapted to be applied in helical fashion to the pipeline, and has a stepped or rabbetted edge to form an overlapping joint, indicated at 21. See also FIG. 3, where the inner layer 13 is shown being applied, using the material of FIGS. 1 and 2.

In FIG. 1, in addition to the tape 13 which is of a uniform thickness all around the pipe, further insulation material is applied as indicated at 25. This added insulation is installed in such a way as to provide, in general, a greater thickness of insulation above the center line of the pipe than below. The reasons for this are twofold. In the first place, any vapors or gases around the pipe which are affected by the heat tend to rise. These vapors and gases will flow upward and carry away heat by convection if not hindered. Moreover, extremes of temperature, i.e. greater temperature gradients, are more likely to be encountered, on the average, above the pipe than below. By providing the pipe with greater insulation above its center than below, the differential thermal losses are compensated for. That is to say, optimum insulation is obtained. With a given quantity of insulation. Finally, an outer wrapping 27 is applied around the insulation. The latter is relatively waterproof and tends to hold the insulation in place. It protects both the insulation and pipe against water and other deleterious materials normally present in the soil.

Referring now to FIG. 3, the pipeline 11 not only has the spiral wrapping 13 which consists of insulating tape spirally wound but has also the additional insulation as mentioned above. The latter, in this case, may be a flowing type insulation of either granular or "cork" type or fibrous type which can be poured in or blown in around the pipeline as the wrapper is closed upon it. The wrapper 27 preferably is formed about the pipe and insulation by appropriate forming tools. It is drawn together sufficiently tightly to hold the insulation in place, particularly the loose insulation 25, so that it will be held reasonably compact but not unduly compacted. At the same time it protects the insulation, and also the pipe, against moisture and other foreign materials which might either cause deterioration or decrease the insulating value of the covering material.

Referring next to FIG. 4, a pipeline 41 is indicated which is wrapped in a continuous style by placing under the pipeline a sheet of outer wrapping material 43 and then pouring or blowing the insulating material which is of the loose, fibrous type or the pelleted or cork type, by any appropriate means. Forming tools of this kind are used to form paper about various materials and are well known in the art. This wrapper sheet is shown at 43 and it is brought into wrapping shape by a travelling set of forming tools, not shown. These tools wrap the outer wrapper 43 around the insulation with its edges overlapping to form a seam 47. As shown in FIG. 5, there may be little or no insulation, other than the wrapper on the bottom of the pipe, which is quite satisfactory for some installations. The wrapper 43 itself of course affords some insulating value and it may be laminated with additional insulation if desired. This arrangement is particularly suitable when the wrapper sheet 43 is a relatively thick fibrous or matted material. It preferably is protected on the outside by a coating of water resistant material such as asphalt or bitumen. Thus a heavily asphalt-coated felt paper or other similar fibrous material having good thermal insulating qualities makes a particularly satisfactory wrapping sheet. By itself, such a material affords fairly good insulating value at the bottom of the pipe.

To augment the insulating value of the sheet 43, additional loose insulating material 45 is added, especially above the pipe. This is shown at the top of FIG. 6. Some of the added loose material falls down around the pipe near the bottom so that there is, in addition to the sheet, some insulating loose material practically all around the pipe. However, the major quantities of the added insulation are at the sides and over the top.

Referring next to FIG. 7, a system is shown in outline for applying insulation to a pipeline in an open trench. Here the pipeline 61 lies in a trench 63 in which has been placed, before the pipe was laid in, a wrapping or cover sheet 65. The latter may be of the same character as that just described in connection with FIGS. 4 to 6. Pipelines may be laid directly on the wrapping sheet but preferably a small amount of insulating material is strewn along the sheet before the pipeline is placed on it. This affords additional insulating value. The sheet is next formed into a generally U shape and some additional flowing insulating material is spilled along on top of the pipe, falling down around its sides as the operation proceeds. For applying the insulation and wrapper rapidly and inexpensively, it is desirable to use mechanical means. As shown in FIG. 8, a tractor provided with a hopper 67 and a chute 69 supplies the loose granular or fibrous insulation which falls in on top of the pipe and spills around its sides and to some extent under the pipe. The timing is such that the sheet is brought to the right curvature or degree of fold to receive and hold the falling particles in proper amount for the kind of insulation required. This tractor 70 preferably moves continuously and carries a series of sheet forming or web forming devices 72, 74, 76, 78, 80, all designed to pick up the edges of the sheet, first lifting it into a U form and then, as the insulation is filled in, to wrap the sheet around the insulation and finally bring its edges into overlapping relationship. This final stage as shown at the left of FIG. 7 at about the point 90. After this shet has had its edges formed in overlapping relation, it is sealed by application of an adhesive and/or by application of heat. The adhesive is preferably a bitumen such as asphalt or a modified asphalt which is applied at elevated temperature so as not only to afford a good seal but also to afford good waterproofing. A spray device 91 is supplied by a line 92 from a source of heated adhesive 93 and so arranged as to supply some of the liquid inside the seam, enough to afford a good adhesive bond between the two edges of the continuous web or sheet 65. Additional material may be sprayed on top of the sheet as the fold is finished and the seam is pressed and sealed by an appropriate forming iron 96.

Referring to FIG. 9, a vehicle of 100 of another type is shown. This is arranged to run along the side of the trench and it is equipped with forming devices 102 and 104, etc., which lift the edges of the sheet on which the pipe rests. As shown in FIGS. 10 and 11, the outer wrapper is brought up into more or less U-shape. Thereupon a self foaming insulation material is injected into the wrapper. This preferably consists of ingredients which form in situ a waterproof insulation material having a high percentage of voids within it so as to afford good thermal insulation. Such a composition is preferably made up of a combination of plural liquid streams, three in this case, which are injected into the wrapper in such a manner as to permit the foaming reaction to take place around the pipe and within the wrapper. These streams comprise a first stream or hot asphalt and a second stream of an acid catalyst. For the purposes of this invention, a 70 percent sulfuric acid is very satisfactory for the catalyst. The third ingredient preferred is a mixture of phenol and an aromatic-formaldehyde resin. Mounted on the vehicle 100 are plural containers 110, 112 and 114. From each of these runs a liquid line, i.e. pipe or hose 116, 118 and 120, respectively. Nozzles are provided so that the three liquids are sprayed to intersect each other in such a manner as to cause effective mixing with each other as they reach the pipeline. As a result, reaction takes place which generates carbon dioxide gas and other vapors and gases. The resulting product sets as it cools into a light foamed resin which is relatively waterproof and has good thermal insulating properties. After this material sets up in part, which it does quite rapidly, the web or sheet 125 is brought around the foam while the latter can still be readily reshaped, and is sealed as indicated in FIG. 11.

Now referring to FIGS. 12 to 15, inclusive, there are shown in section successive steps of a system which has some features in common with those described above.

Before the pipeline is put into the trench, a sheet 140 is laid in the trench. It may be laid flat if the trench is wide enough, or it may have its edges somewhat turned up if the trench is narrower. Along the center line of the trench, where the pipe is to be laid, a pipe supporting material 141 is placed on the wrapper. This material is preferably sufficiently rigid to support the weight of the pipeline. It may be of light wood or plastic. Preferably a foam type resinous block, of which there are several kinds available on the market, for example, styrofoam or less expensive materials of similar properties may be used as the supporting material. This strip or block 141, or rather a series of blocks, need not be very wide, just wide enough to support the pipe so that it will not roll off.

Next, the wrapper is formed up into a U-shape and the particulate insulation, fibrous or cork type or both, is poured along the sides of the pipe to flow under it and fill the spaces 142 alongside the block or strip material 141. Meanwhile, the sheet is being folded farther—see FIG. 14—and added insulation covers the sides of the pipe and begins to cover the top. Finally, the top edges of the sheet 140 are joined and the insulation covers bottom, sides and top, being thicker on top than on the bottom. See FIG. 15.

It will be understood that various combinations of wrapping and insulating materials come within the purview of the invention. The wrapper preferably is of sufficient tensile strength that it will hold the insulation snugly compacted but not compressed around the pipeline. It is sufficiently liquid-tight and vapor-tight that it gives protection for the pipe against ground water and other vapors and liquids. The spiral wrapping material of FIG. 2 is preferably used next to the pipe, though it can be omitted in some cases. Preferably, somewhat more than 50% of the total bluk lies above the center line of the pipe. Thermal insulation is applicable for cold or refrigerated pipelines as well as heated lines.

The insulation material under the pipe, which supports its weight, preferably has higher structural strength than the usual pelleted or fibrous type insulating materials and such materials may be used all around the pipe, if desired. It has sufficient strength in compression to bear the load imposed on it without substantial loss of its insulating properties. Where the pipe is deeply covered or is laid under conditions where heavy loads will bear upon it, a rigid or semi-rigid foam, or an equivalent material, is preferred for the total insulation. In many cases it can be used merely below the pipe, and in fairly thin section, while the less expensive pelleted products such as expanded perlite, vermiculite, or fibrous material such as glass wool or fiber, or asbestos, in the form of mats or in loose form, supply the bulk of the thermal insulation elsewhere around the pipe.

In all cases, it is preferred that the outer wrapper be coated and/or impregnated with asphalt, wax, bitumen, a thermoplastic material such as polyolefin resin, or combinations of these. This sheet usually will be of paper or fibrous cellulose base for reasons of economy, but it may be composed of or laminated with plastic sheeting materials of various known types such as vinyl polymers, polyethylene, polypropylene, and other analogous materials well known in the art.

It is understood that various modifications and substitutions of materials will suggest themselves to those skilled in the art.

What is claimed is:

1. An improved method of insulating a pipeline having a central axis and carrying a fluid at a temperature differing substantially from that of its surrounding environment, which comprises the steps of (1) flowing into place about said pipeline a porous thermal insulating material such that a relatively greater amount of said insulating material is located above than below said central axis of said pipeline; and (2) enclosing said insulating material within a substantially fluid impervious wrapper such that a mild compression is exerted by said wrapper on the enclosed insulating material, whereby thermal losses in the pipeline are substantially minimized.

2. The method according to claim 1 wherein prior to step (1) comprising the step of wrapping said pipeline in spiral fashion with a relatively thick insulating strip of material.

3. The method of wrapping a pipeline for thermal insulation which comprises the steps of laying a web of moisture-resistant outer wrapper sheet material under the line, with marginal edges extending laterally on each side of the line, raising said edges to impart a general U-shape cross-section to said web, flowing insulating material into said cross-section so as to provide insulation for the pipe at its bottom, sides and top surfaces, placing more than half the total volume of the insulating material above the center line of the pipe, thereafter bringing the marginal edges of the wrapper into overlapping relationship so as to enclose the insulation with mild compression which is exerted thereon by said wrapper and sealing the overlapping portions of said marginal edges together.

4. The method according to claim 3 wherein immediately prior to the step of bringing said marginal edges into overlapping relationship, comprising the step of casting said insulating material into a foamed mass while said material is in situ.

5. The method according to claim 3, wherein the insulating material comprises a particulate type material.

6. Method according to claim 3 wherein the insulating material is a pelleted cork-type material.

7. Method according to claim 3 including the step of placing a rigid insulating material of substantial strength in compression on said sheet and under the pipeline.

8. The method of applying thermal insulation to a pipeline which comprises the steps of placing, about the line, a continuous moisture-resistant web of width sufficient to wrap the line and insulation applied thereto, progressively raising the edges of said web and folding them around said pipeline, flowing insulating material onto and around said pipeline while the web is being folded, placing more than half the total volume of the insulating material above the center line of the pipe and progressively sealing the edges of the web together to enclose said insulating material under mild compression exerted thereon by said web, whereby thermal losses in said pipeline are substantially minimized, and said pipeline and said insulating material are substantially protected against intrusion of moisture and analogous ground fluids.

9. Method according to claim 8 including the step of placing a rigid supporting mass of insulating material under said pipeline and on said web before other insulating material is added.

(References on following page)

References Cited

UNITED STATES PATENTS

| | | | |
|---|---|---|---|
| 2,007,779 | 7/1935 | Vilen et al. | 156—215X |
| 2,110,565 | 3/1938 | Yeager | 156—215 |
| 2,746,516 | 5/1956 | Cummings | 156—392 |
| 2,937,967 | 5/1960 | Morrison | 156—215X |
| 3,259,533 | 7/1966 | Philipson | 156—201 |
| 1,929,817 | 10/1933 | Helsing | 138—140 |
| 2,047,778 | 7/1936 | Hayden | 138—149X |
| 2,054,769 | 9/1936 | Holtz | 156—337X |
| 2,158,772 | 5/1939 | Beckwith | 156—187X |
| 2,707,984 | 5/1955 | Goff | 156—187X |
| 2,773,512 | 12/1956 | Burk | 61—72.1 |
| 2,918,940 | 12/1959 | Carr | 156—187X |
| 3,231,443 | 1/1966 | McNulty | 156—187 |
| 3,313,321 | 4/1967 | Keller | 138—149X |
| 3,380,258 | 4/1968 | Young | 138—149X |
| 2,857,648 | 10/1958 | March | 138—140X |

FOREIGN PATENTS

| | | | |
|---|---|---|---|
| 942,718 | 11/1963 | Great Britain | 156—215 |

OTHER REFERENCES

Stoever: "Applied Heat Transmission," 1941, pp. 61, 104.

JOHN I. GOOLKASIAN, Primary Examiner

J. C. GIL, Assistant Examiner

U.S. Cl. X.R.

61—72.1; 138—141, 149, 151, 156, 164; 156—77, 191, 202, 215, 276, 392, 425; 161—116, 139